US012389513B2

(12) United States Patent
Reiss et al.

(10) Patent No.: US 12,389,513 B2

(45) Date of Patent: Aug. 12, 2025

(54) PORTABLE MULTI-FUNCTION LIGHTING DEVICE WITH BUILT-IN MASTER-SLAVE CONTROLLER AND AN INTEGRATED LIGHTING SYSTEM AND METHOD USING THE PORTABLE MULTI-FUNCTION LIGHTING DEVICE

(71) Applicant: CHAUVET & SONS, LLC, Sunrise, FL (US)

(72) Inventors: Allan B. Reiss, Coral Springs, FL (US); Raglan O. Jones, Hollywood, FL (US); Li Jiagen, Shenzhen (CN)

(73) Assignee: Chauvet & Sons, LLC, Sunrise, FL (US)

( * ) Notice: Subject to any disclaimer, the term of this patent is extended or adjusted under 35 U.S.C. 154(b) by 175 days.

(21) Appl. No.: 18/315,814

(22) Filed: May 11, 2023

(65) Prior Publication Data

US 2023/0380040 A1 Nov. 23, 2023

Related U.S. Application Data

(60) Provisional application No. 63/344,257, filed on May 20, 2022.

(51) Int. Cl.

*H05B 47/155* (2020.01)

*F21L 14/00* (2006.01)

(Continued)

(52) U.S. Cl.

CPC ............ *H05B 47/155* (2020.01); *F21L 14/00* (2013.01); *F21V 21/108* (2013.01); (Continued)

(58) Field of Classification Search

CPC ....... H05B 47/155; H05B 47/19; F21L 14/00; F21V 21/108; F21V 23/003; F21W 2131/406

(Continued)

(56) References Cited

U.S. PATENT DOCUMENTS

| | | | |
|---|---|---|---|
| 4,167,783 | A | 9/1979 | Mitchell |
| 8,087,797 | B2 | 1/2012 | Pelletier et al. |

(Continued)

FOREIGN PATENT DOCUMENTS

| | | | |
|---|---|---|---|
| EP | 2139299 | A2 | 12/2009 |
| EP | 3229463 | A1 | 10/2017 |
| WO | 2014043551 | A1 | 3/2014 |

OTHER PUBLICATIONS

Nova Flex "DMX Lighting Basics", Jul. 28, 2022, 8 pages (Year: 2022).*

*Primary Examiner* — Laura K Tso

(74) *Attorney, Agent, or Firm* — Laurence A. Greenberg; Werner H. Stemer; Ralph E. Locher

(57) ABSTRACT

A portable multi-function lighting device is provided that includes a built-in digital controller configured to be connected wirelessly with one or more other lighting fixtures in a master-slave relationship in order to perform a coordinated light show. The portable multi-function lighting system is configured with a plurality of different types of lighting fixtures for performing different types of effects. The portable multi-function lighting device wirelessly transmits control signals to other fixtures that include a lighting effect or a theatrical or special effect, which fixtures are external to, i.e., not part of, the portable multi-function lighting device to coordinate a show in which like types of effects of the separate fixtures and of the portable multi-function lighting device are coordinated with one another.

21 Claims, 9 Drawing Sheets

(51) Int. Cl.

| | |
|---|---|
| ***F21V 21/108*** | (2006.01) |
| ***F21V 23/00*** | (2015.01) |
| ***F21W 131/406*** | (2006.01) |
| ***H05B 47/19*** | (2020.01) |

(52) U.S. Cl.
CPC ........... *F21V 23/003* (2013.01); *H05B 47/19* (2020.01); *F21W 2131/406* (2013.01)

(58) Field of Classification Search
USPC ..................................................... 362/249.01
See application file for complete search history.

(56) References Cited

U.S. PATENT DOCUMENTS

| | | | | |
|---|---|---|---|---|
| 9,185,776 | B2 | 11/2015 | Ahem | |
| 10,094,542 | B2 | 10/2018 | Chauvet et al. | |
| 10,197,257 | B2 | 2/2019 | Gammons et al. | |
| 2013/0278169 | A1 | 10/2013 | Reinoso | |
| 2015/0223307 | A1* | 8/2015 | Smith | H05B 47/19<br>315/210 |
| 2019/0230772 | A1 | 7/2019 | Reiss et al. | |

* cited by examiner

PORTABLE MULTI-FUNCTION LIGHTING DEVICE WITH BUILT-IN MASTER-SLAVE CONTROLLER AND AN INTEGRATED LIGHTING SYSTEM AND METHOD USING THE PORTABLE MULTI-FUNCTION LIGHTING DEVICE

CROSS-REFERENCE TO RELATED APPLICATIONS

The present application claims the priority, under 35 U.S.C. § 119(e), of U.S. Provisional Patent Application No. 63/344,257 filed on May 20, 2022; That application being incorporated herein, by reference, in its entirety.

BACKGROUND OF THE INVENTION

Field of the Invention

The present invention relates to the control of lighting equipment and, more particularly, to a portable multi-function lighting device having a built-in controller for the wireless, master-slave control of multiple light fixtures, including different types of light fixtures, and/or other accessory devices, and to an integrated lighting system and method that uses the portable multi-function lighting device.

Description of the Related Art

Systems and methods for providing visual effects are known in the art. See, for example, PCT patent application No. WO 2014/043551 A1 to Woods et al., discloses a compact modular visual effects device including a housing having a plurality of receptacles each adapted to receive and to provide at least a supply of power and a control signal via a control signal input to an interchangeable visual effects device. U.S. Pat. No. 4,167,783 to Mitchell discloses a portable lighting system that includes a stand having an adjustable effective length which positions lights carried on a frame and having a foot operated dimmer. U.S. Pat. No. 8,087,797 to Pelletier discloses an illumination device with detachable light sources. U.S. Pat. No. 9,185,776 to Ahern discloses a user-actuated lighting effect device including a housing, a light-generating lamp coupled to the housing a power source and a control circuit.

Portable multi-function lighting systems offer a variety of lighting functions in a single unit. Used by production, entertainment and event companies, disc jockeys (DJs), and venues, they can be brought to remote locations and venues that do not otherwise have lighting installations capable of producing the lighting effects desired for a particular event. One particularly versatile portable multi-function lighting system is described in U.S. Pat. No. 10,094,542 to Chauvet et al. (hereafter, the "'542 patent"), that patent being incorporated herein by reference in its entirety.

The '542 patent discloses, among other things, operating a plurality of portable multi-function lighting apparatuses in a master-slave system by ganging or daisy-chaining together the digital DMX output of a first device to the digital DMX input of the next device using an appropriate cable, and so on until all units are connected. See, for example, FIG. 8 of the Chauvet patent. Col. 7, lines 20-21 of the '542 patent state "[a]lternately, they may be daisy-chained using wireless control protocols, such as wireless DMX."

Typical master-slave lighting setups require all lighting fixtures to be of the exact same type (i.e., all fixtures being the same fixture model). What is needed is a lighting system that can mix and match different types of fixtures in a master-slave configuration.

What is additionally needed is a portable multi-function lighting device having a built-in digital controller that can wirelessly connect the portable multi-function lighting device to other portable multi-function lighting devices and to control those other portable multi-function lighting apparatuses in a master-slave configuration without the use of cables and/or wireless DMX. What is further needed is a portable multi-function lighting device having a built-in digital controller that can wirelessly and simultaneously control a plurality of types of lighting devices (both portable multi-function lighting apparatuses and fixtures that are not portable multi-function lighting apparatuses) in a master-slave configuration without the use of cables and/or wireless DMX to create an integrated lighting system that operates in a coordinated fashion.

BRIEF SUMMARY OF THE INVENTION

The present invention is particularly suited to meet the above-described needs in a manner not previously known or contemplated. It is accordingly an object of the invention to provide a portable multi-function lighting device including a built-in digital controller that is configured to be connected wirelessly with one or more other lighting fixtures in a master-slave relationship in order to perform a coordinated light show. In one particular embodiment, a portable multi-function lighting device is configured with a plurality of different types of lighting fixtures to perform different lighting effects. A digital controller of the device wirelessly transmits control signals to other lighting fixtures separate from the portable multi-function lighting device to coordinate a show in which like types of effects of the separate, external fixtures and of the portable multi-function lighting device are coordinated with one another. In another embodiment, the portable multi-function lighting device communicates with other devices separate from the device, to create an integrated lighting system wherein the performance of effects is coordinated by the portable multi-function lighting device.

Although the invention is illustrated and described herein as embodied in a portable multi-function lighting device with built-in master-slave controller and an integrated lighting system and method using the portable multi-function lighting device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The foregoing background, as well as the following detailed description of the preferred embodiments, is better understood when read in conjunction with the appended drawings. For the purpose of illustrating the invention, there is shown in the drawings an exemplary embodiment that is presently preferred, it being understood however, that the invention is not limited to the specific methods and instrumentalities disclosed. Additionally, like reference numerals represent like items throughout the drawings. In the drawings.

DETAILED DESCRIPTION OF THE INVENTION

Figure 1:
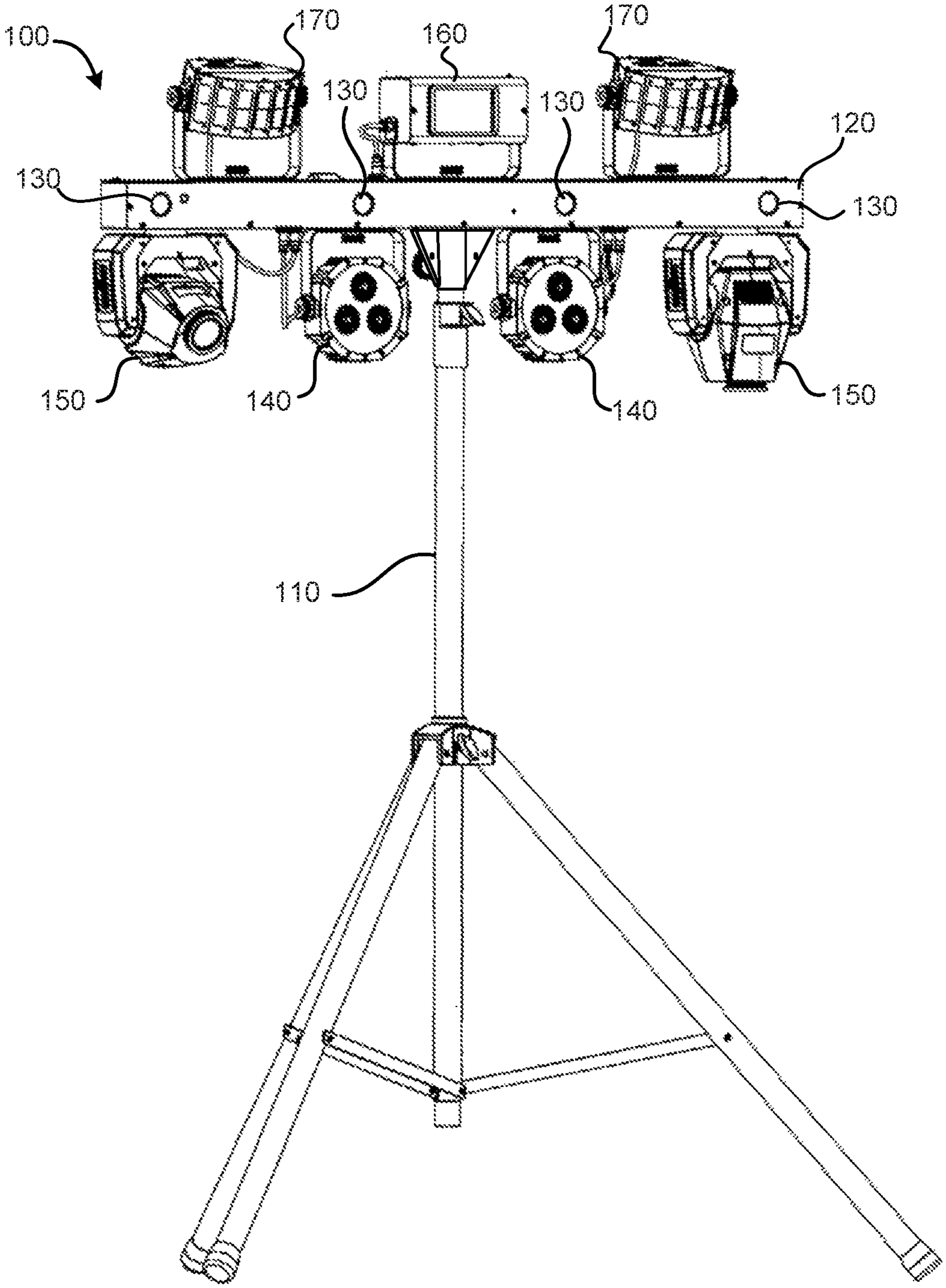
FIG. 1 is an isometric view of a portable, multi-function lighting apparatus, in accordance with one particular embodiment of the invention.
Figure 2:
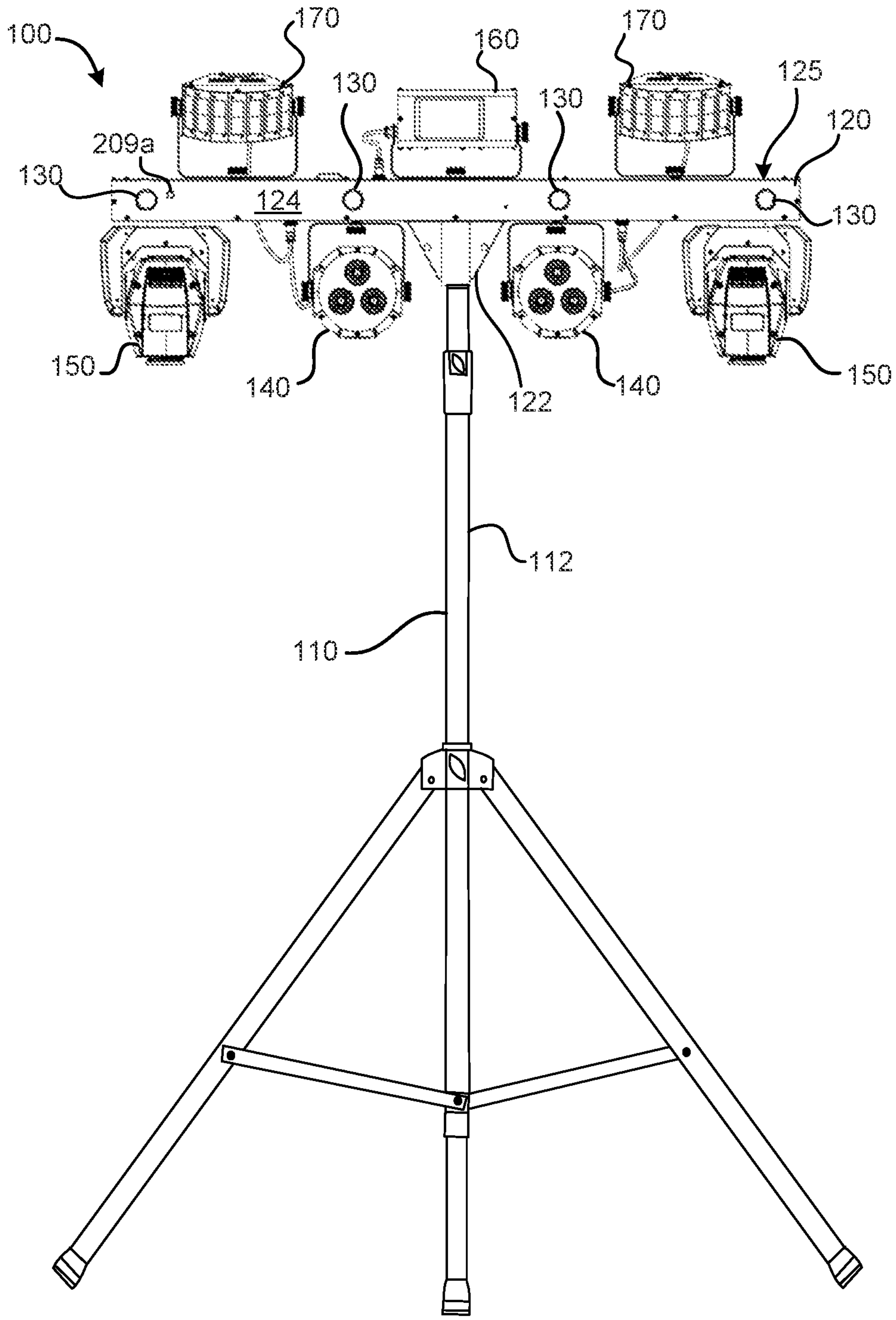
FIG. 2 is a front plan view of the portable, multi-function lighting apparatus of FIG. 1.
Figure 3:
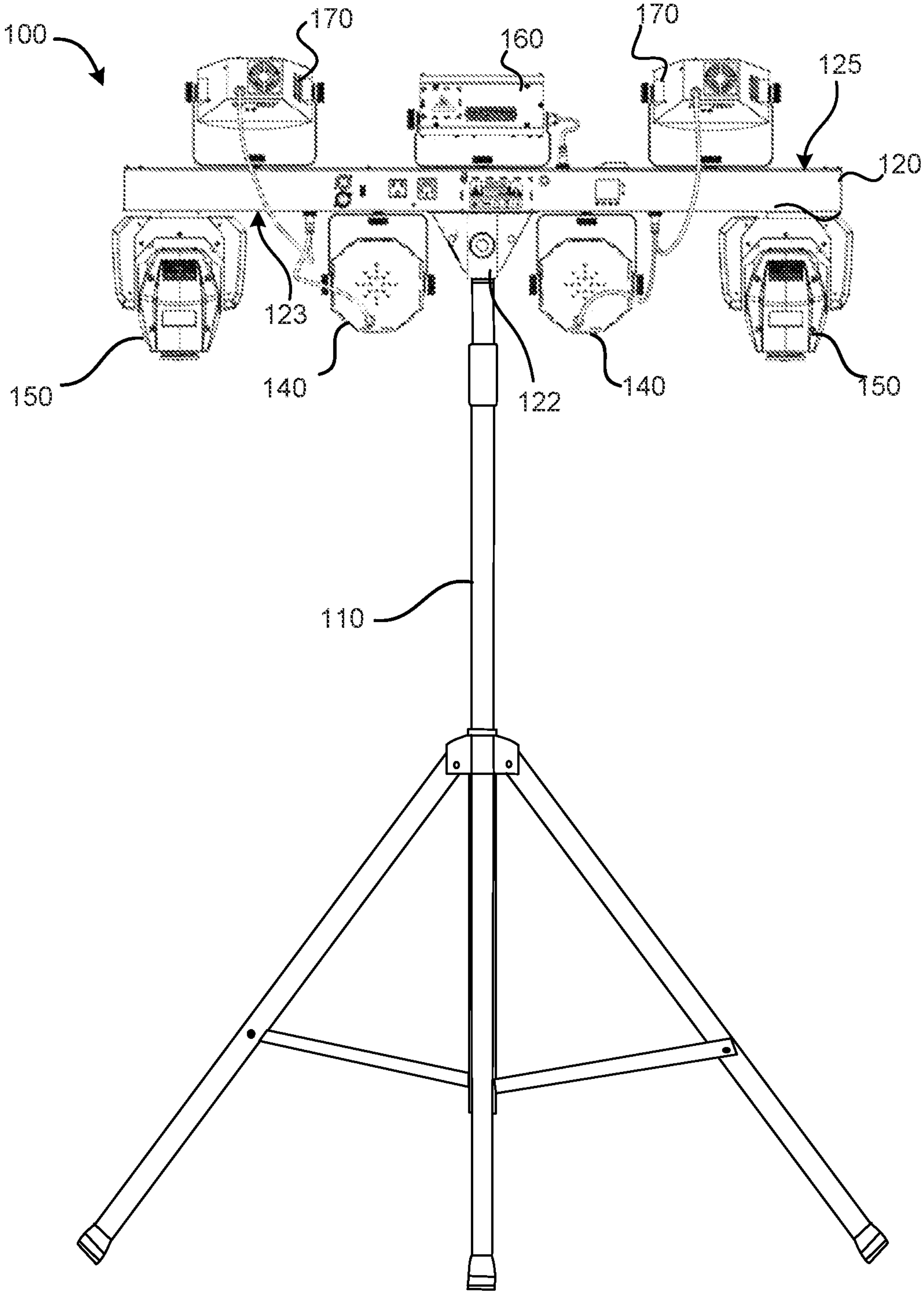
FIG. 3 is a rear plan view of the portable, multi-function lighting apparatus of FIG. 1.

Before explaining the disclosed embodiment of the present invention in detail, it is to be understood that the invention is not limited in its application only to the details of the particular arrangement shown since the invention is capable of other embodiments. Also, the terminology used herein is for the purpose of description and not of limitation.

Referring now to FIGS. 1-5, the present invention is directed towards a portable, multi-function lighting device 100 having built-in master-slave control. More particularly, the portable, multi-function lighting device 100, in addition to controlling the peripherals mounted to, and incorporated in, the frame of the portable, multi-function lighting device 100, the lighting device 100 includes a built-in control center for wirelessly communicating with other compatible lighting fixtures and devices to form an integrated, intelligent lighting system that is portable and reconfigurable, in situ.

The portable, multi-function lighting device 100 is built around a frame or mounting bar 120 detachably connected to the telescoping pole 112 of a folding tripod 110, via the tripod mount 122. The mounting bar 120 is configured to provide power and data to a plurality of lighting fixtures and/or other types of modules and accessories 130, 140, 150, 160, 170, mounted to the mounting bar 120. In the most preferred embodiment, the mounting bar 120 acts as a power and data bus for the attached fixtures 130, 140, 150, 160, 170, as well as other electrical devices. Note that fewer or more peripherals, or even different peripherals, may be attached to the mounting bar 120 without departing from the scope and spirit of the present invention.

It should be noted that, although the embodiment described above includes only light fixtures 140, 160 and 170 removably mounted to the mounting bar 120, it should be appreciated that any type of equipment capable of providing theatrical or special effects, such as speakers, atmospheric machines, confetti launching machines and pyrotechnic equipment may additionally and/or alternatively be used in place of, or in addition to, the fixtures 140, 160 and 170, without departing from the spirit and scope of the present invention. Further, it should be understood that the light fixtures 140, 160 and 170 can each be placed on the mounting bar 120 in a plurality of locations.

In the particular embodiment of the invention illustrated, the portable, multi-function lighting device 100 is composed of the mounting light bar 120, a plurality of lights, fixtures and peripherals 130, 140, 150, 160, 170, and a tripod 110. Mounting light bar 120 is generally rectangular shaped with a generally square cross section and a hollow interior cavity. In one particular embodiment, the mounting light bar 120 includes at least one light 130 mounted in a hollow interior cavity of the light bar 120 and oriented to project light outward from a hole in the front face 124. In one preferred embodiment, four strobe lights 130 are mounted in the light bar 120 and oriented to project light from four corresponding holes in the front face 124 of the mounting bar 120. Thus, the four strobe lights 130 are structured to project a strobe light effect outward from the front face 124. It should be appreciated, however, that this is not meant to be limiting, as more or fewer lights 130 can be mounted in the mounting bar 120, and other types of lights 130 and/or other lighting effects, such as ultraviolet lights, can be provided without departing from the scope and spirit of the present invention. Additionally, it should be understood that, within the scope of the present invention, one or more of the lights 130 may be omitted, and/or one or more additional openings in the mounting bar 120 may be provided, so that another type of equipment capable of providing theatrical or special effects, such as speakers, atmospheric machines, confetti launching machines and pyrotechnic equipment, may additionally and/or alternatively be used in the mounting bar 120 in place of, or in addition to, the lights 130. For example, in one particular example, a light 130 can be replaced by a fog machine located inside the mounting bar 120 that would produce fog that is emitted from the opening provided for the replaced light 130. Such additional/alternative theatrical or special effects equipment can share a power source and controller with the lights 130.

In the particularly preferred embodiment illustrated in FIGS. 1-5, the peripherals attached to the mounting bar 120 include two hex color LED par light fixtures 140, two moving head spotlights 150 that pan and tilt under motorized control, a laser 160 and two derby light fixtures 170. However, it should be appreciated that more or less than four light fixtures 140, 160, 170, other types of light fixtures 140, 160, 170, in place of the par, laser and derby light fixtures, including moving light fixtures, different quantities of each type of light fixture 140, 160, 170, and different order and placement of the light fixtures 140, 160, 170, on the mounting light bar 120 may be used without departing from the spirit and scope of the present invention.

To facilitate attachment of the peripherals, the mounting bar 120 includes a plurality of threaded mounting holes, in its top and/or bottom face for securing the peripherals 140, 160 and 170. More particularly, the light fixtures 140, 160, 170, are removably secured to the bottom face 123 or top face 125 of the mounting light bar 120 by threaded knob screws 127, but may be removably secured by any other means now known or later developed. For example, the fixtures 140, 160, 170, may snap into holes in the bottom face 123 or top face 125, or may slide to discrete locations in a track formed in the bottom of the bar 120, or, in another embodiment, may be physically and electrically connected to the bar 120 using a bayonet connector or other such mechanism. In the preferred embodiment shown in FIGS. 1-5, five removable, reconfigurable light fixtures 140, 160, 170, are shown, but it should be appreciated that the number and types of light fixtures may vary within the spirit and scope of the present invention.

In the present particular embodiment, each removable light fixture 140, 160, 170, includes a mounting bracket 129 that is configured to be removably secured to the mounting bar 120 by the threaded knob screws 127. Similarly, each light fixture 140, 160, 170, is removably secured between the side arms of the mounting brackets 129 by threaded screws 128, which are also, preferably, threaded knob screws. Threaded screws 128 are also used to adjust the illuminating angle and direction of each light fixture 140, 160, 170. Configured as shown, each of the fixtures 140, 160, 170, is individually adjustable relative to the bar 120, such that the user may direct the light from each light fixture 140, 160, 170, in the same or different directions.

Using the threaded knob screws 127 and 128, the device 100 can be reconfigured by the user, in situ. For example, the positions of the fixtures 140, 160, 170, on the bar 120 can be swapped around, or the fixtures 140, 160, 170, themselves can be removed and/or replaced with other types of light fixtures or other types of non-light fixture modular accessory devices. In the presently illustrated preferred embodiment, a pair of moving head spotlights 150 are additionally attached to the mounting bar 120. The tripod 110 and fixtures 140, 160, 170, can be of the types described in, and can be configured and/or reconfigured as described in, U.S. Pat. No. 10,094,542, which patent is being incorporated herein by reference in its entirety, for all that it teaches.

Figure 4:
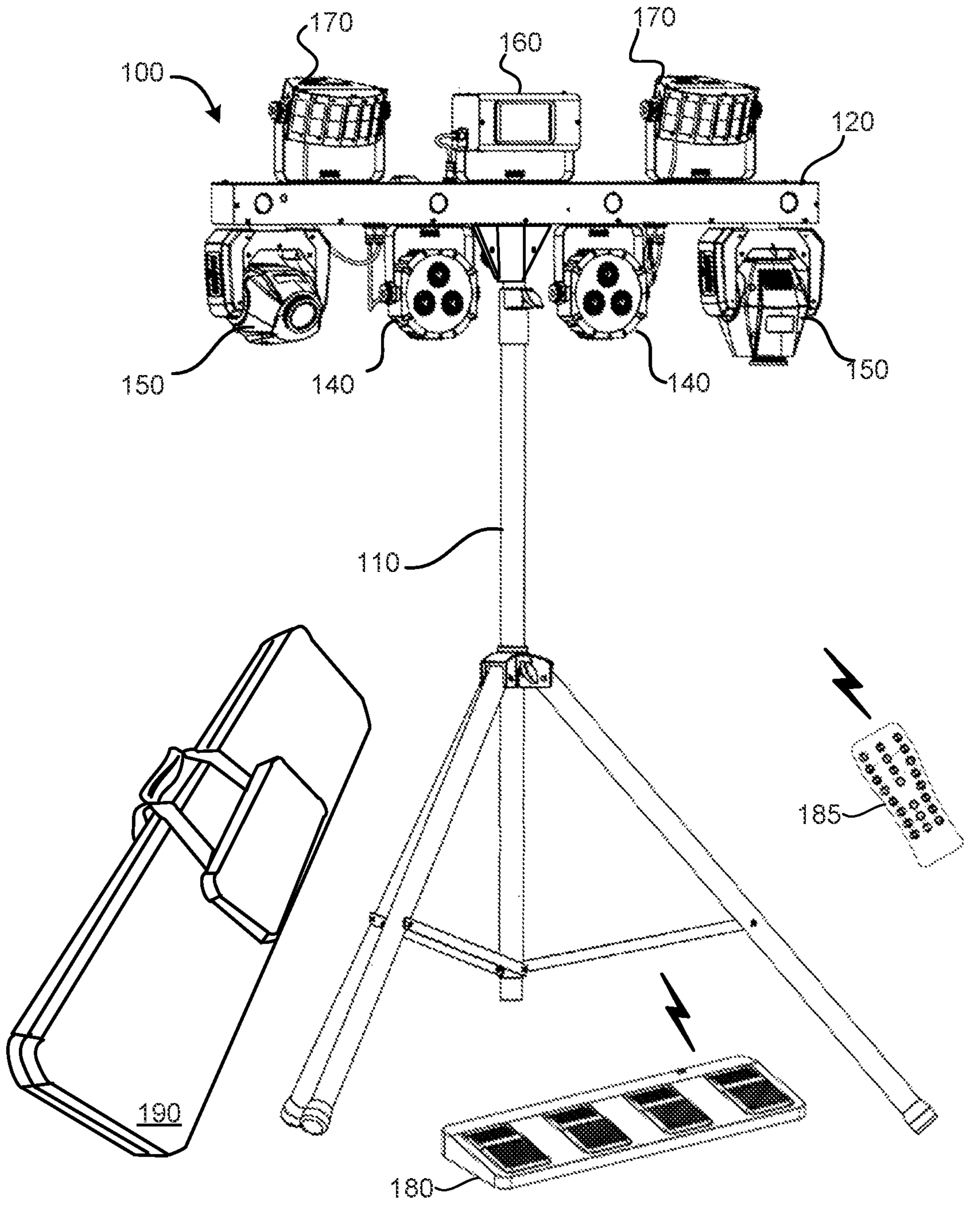
FIG. 4 is a front perspective view of a portable, multi-function lighting apparatus kit in accordance with one particular embodiment of the invention.
Figure 5:
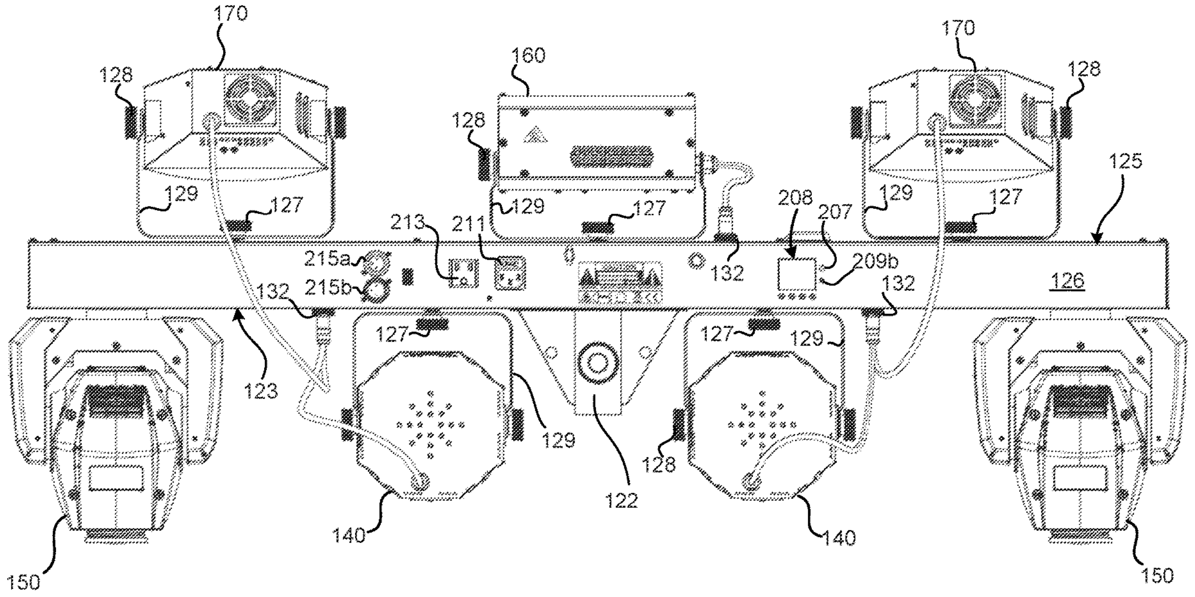
FIG. 5 is an enlarged rear plan view of the mounting bar of FIG. 3.

As illustrated in FIG. 4, the portable multifunction lighting device 100 can be included as part of a kit that includes the mounting bar 120 with built-in strobes 130, light fixtures 140, 150, 160, 170 and removable tripod 110, as well as other items. For example, in one particular embodiment of the invention the portable, multi-function lighting device 100 could be sold as a kit including one or more of a wireless footswitch 180, a wireless remote control 185 and/or storage/carry bag 190. When not in use, the mounting light bar 120 may be removed from the telescoping pole of the tripod 110, the telescoping pole may be fully retracted and the tripod 110 may be moved into its compact position, so that all components of the portable, multi-function lighting device 100 may be placed into one or more storage bags 190 for easy transport and storage. The portable, multi-function lighting device 100 may then be easily transported and reassembled at the next location for use.

Figure 6:
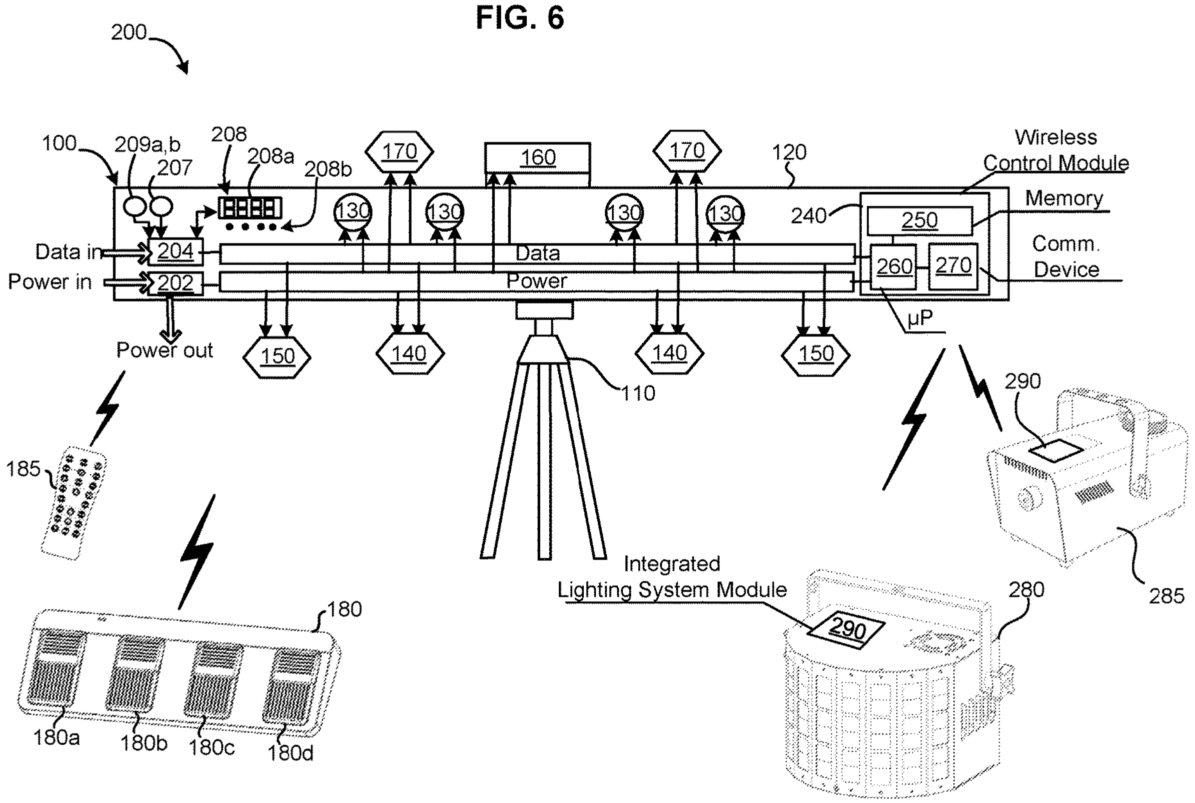
FIG. 6 is a simplified block diagram of an integrated lighting system including a portable multi-function lighting device in accordance with one particular embodiment of the invention.

Referring now to FIG. 6, there is shown one particular embodiment of the portable multi-function lighting device 100 that includes not only the internal components necessary to coordinate a show using the devices 130, 140, 150, 160, 170 of the device 100, but also a built-in, wireless control module or controller 240 for providing wireless, synchronized master-slave control of lighting fixtures 280 and other devices 285 not integrated in, or mounted to, the mounting bar 120. More particularly, the wireless control module 240 facilitates an integrated lighting system that permits total synchronization of different types of intelligent lighting fixtures 280 that include a compatible integrated lighting system module 290.

Referring now to FIGS. 1-6, the mounting bar 120 has a hollow interior containing the control system for the lighting device 100. For example, the mounting bar 120 includes a power supply 202 and controller 204. The power supply 202 is structured to provide power to the light fixtures 140, 150, 160, 170, the strobe lights 130 secured within the mounting bar 120 in alignment with holes in the front face 122 of the mounting bar 120, the controller 204, a user interface 208 and the wireless control module 240. In one particular embodiment, the controller 204 is configured to run firmware and/or software programs that control the operation of the lighting components 130, 140, 150, 160, 170. Each preprogrammed software program stored in memory of the controller 204, and executed by the controller 204, is structured to operate the lighting components 130, 140, 150, 160, 170, in a predetermined sequence. The controller 204 can be implemented using a microprocessor, microcontroller, an ASIC, or a like hardware device.

Connection ports 132 are provided on the bottom face 123 and/or top face 135 of the mounting light bar 120 to electrically connect the light fixtures 140, 160, 170, to the power supply and receive data from the controller within the mounting light bar 120, via a cable or cables from the fixtures 30. The connection ports 132 are electrically connected to the power supply and controller by cables or a bus within the mounting light bar 20. The moving head spotlights 150 are additionally connected to power from the power supply 202 and data from the controller 204, inside the mounting bar 120. Additionally, if desired, one or more different types of integrated lighting system fixtures including an integrated lighting system module 290 can be mounted to the mounting bar 120, and wirelessly controlled by the wireless control module 240. In particular, such fixtures can be physically attached to the mounting bar 120, but would not have any physical data connection to the bar, i.e., having only a wireless data connection existing between the fixture and the bar. If additionally desired, such an integrated lighting system fixture mounted on the bar 120 can be battery powered, so that there is also no physical power connection between the integrated lighting system fixture and the mounting bar 120.

Electrical outlets 211, 213 (for power in and power out, respectively) and additional connection ports (such as, DMX input interface or port 215*a* and DMX output interface or port 215*b*) may be provided on the rear face 126 of the mounting bar 120 to allow for other electrical equipment, such as a DJ's laptop or other lights or equipment, to be powered from (via, outlet 213), and provide control data to (via port 215*b*), the mounting bar 120. This capability provides the flexibility to combine the multi-function lighting device 100 with other equipment to provide an expanded portable entertainment system for the event.

The portable, multi-function lighting device 100 may be controlled at the device 100 by manually selecting and activating one of the automated programs stored within the controller 204 using the control panel buttons 208*b* located beneath the LCD display 208*a* of the user interface 208, which provides information to the user regarding control panel operation and device operating modes. Additionally, in one particular embodiment of the invention, one of the pre-stored, automated programs within the controller 204 may be sound activated using the microphone 207. Alternatively, one of the automated programs stored within the controller 204 may be activated remotely by the user from a footswitch 180, which may be connected to the controller 204 via a wired or, more preferably, a wireless connection. In one particular embodiment illustrated, the footswitch 180 wirelessly communicates with the controller 204 by infrared or radio frequency signals received by one of the front or rear sensors 209A, 209B of the device 100. Additionally, more than one pedal 180a-180d of the footswitch 180 may be provided for controlling more than one function, light or fixture of the device 100.

A remote control 185 can additionally be provided to interact with the controller 204 and actuate different effects from the lights and devices on the mounting bar 120. In one particular embodiment of the invention, the remote control 185 can be an infrared remote control that beams signals via a line-of-sight connection to one of the sensors 209a, 209b. Alternately, if one or more of the sensors 209a, 209b is/are a radio frequency sensor, the remote control 185 and/or footswitch 180 may communicate with the device 100 via RF signals which do not require a line-of-sight connection to the device 100.

The portable, multi-function lighting device 100 may be controlled remotely from an external, digital multiplexing protocol (DMX) controller, as described in U.S. Pat. No. 10,094,542. Additionally, the portable, multi-function lighting device 100 may be controlled by a digital data controller providing digital data control signals in accordance with a data control protocol, such as, but not limited to, digital multiplexing (DMX512 or DMX), ACN, ArtNet, KlingNet, Dali or other known or later developed data control protocols. Further, the portable multi-function lighting device 100 of the present invention can be linked and/or daisy-chained to one or more other portable, multi-function lighting devices 100 using the DMX input and/or output 215a, 215b, as described in U.S. Pat. No. 10,094,542.

However, the portable, multi-function lighting device 100 of the present invention may also be controlled by, or may wirelessly control another external device that is not part of the multi-function lighting device 100, using the wireless control module 240 built into the mounting bar 120 of the portable multi-function lighting device 100. More particularly, the portable multi-function lighting device 100 of the present invention can be used to address one or more external intelligent lighting fixtures 280 and/or external theatrical or special effects devices 285 (e.g., speakers, atmospheric machines, confetti launching machines, pyrotechnic equipment, etc.) having a compatible wireless integrated lighting system module 290 that is able to receive and process the signals transmitted by the wireless control module 240.

The wireless control module 240 includes a memory device 250 that stores therein control algorithms and saved automated light shows made up of lighting programs and scenes. As used herein, "scenes" are static lighting states; while "programs" are a series of scenes stacked one after another. A lighting program can be programmed as either a single scene or multiple scenes in sequence, wherein each step or scene can be composed with a movement effect (i.e., pre-constructed Pan/Tilt movements that can be applied to a scene). In one particular embodiment, up to 485 scenes can be stored in a single program. Additionally, if desired, a lighting program can include control signals to coordinate other types of theatrical or special effects (i.e., fog, sound, confetti, etc.) with the programmed lighting scene or scenes.

A controller or processor 260 connected to the memory device 250 executes the control algorithms to generate control signals that are transmitted wirelessly to the one or more lighting fixtures or external devices 280, 285 of the integrated lighting system 200, via a communications module 270 of the wireless control module 240. In one preferred embodiment, the processor 260 is a digital microprocessor or microcontroller configured to run firmware and/or software to execute lighting programs, generate a stream of lighting commands relating to an entire light show or program, provide the lighting commands to the communications module 270 for transmission to any linked (i.e., chained) slave devices, and/or receive and process lighting commands received from a master device via the communications module 270. In one particularly preferred embodiment, each lighting program is pre-programed and stored in the memory device 250 and is made up of lighting commands designed to control the different types of lighting fixtures and external devices 280, 285 in a coordinated manner. For example, the lighting program may include separate lighting commands for moving lights, derbies, strobes, wash lights, fog machines, etc. In the present embodiment, each lighting fixture and external device 280, 285 of the integrated lighting system 200 receives the full lighting program and executes the lighting commands within the portion of the lighting program intended for that specific type of lighting fixture and external device 280, 285. In one particular embodiment of the invention, the processor 260 is programmable using the user interface 208 on a face of the mounting bar 120. If desired, the processor 260 may be programmed from an external source (i.e., a laptop, a DMX controller, remote control 185, etc.).

The communications module 270 includes a wireless transceiver device configured to transmit and receive radio frequency signals wirelessly. In one particular embodiment, the communications module 270 transmits and receives 2.4 GHz radio frequency signal. Similarly, in one particular embodiment of the invention, each integrated lighting system module 290 includes a hardware device configured to wirelessly receive radio frequency signals transmitted by the communications module 270. In one embodiment, the integrated lighting system module 290 includes a transceiver device that can send radio frequency transmissions, as well as receive them. In another particular embodiment, the integrated lighting system module 290 includes the controller for processing the received signals, but does not, itself, include a receiver or transceiver, but such a receiver or transceiver is separately connected to the external device 280, 285 via a port (not shown) of the external device 280, 285. The port may be a standard USB port (type A, type B, type C, etc.), a standard 3-pin or 5-pin DMX port or any other port capable of communicating control signals to the external device 180, 285. Receiver devices that can be used by the external device 280, 285 to receive signals wirelessly and provide them to the intelligent lighting system module 290 include the CHAUVET DJ D-FI XLR RECEIVER and the CHAUVET DJ D-FI USB WIRELESS DMX TRANSCEIVER, both currently sold by CHAUVET LIGHTING®.

Each wireless integrated lighting system module 290 of the one or more external lighting fixtures 280 or external devices 285 can distinguish signals relevant to its operation and use them accordingly. More particularly, the wireless control module 240 of the portable multi-function lighting device 100 can be used to synchronize the operation of lighting fixtures and other devices, including moving lighting fixtures, that are of different types. Intelligent lighting fixtures and devices having a wireless module 290 can thus be linked together in an integrated lighting system, regardless of their type, to perform synchronized light shows based on the control signals received from the wireless control module 240.

Using the wireless control module 240, intelligent fixtures including a compatible wireless module 290, i.e., scanners, yokes and projectors, can be synchronized even on stand-alone mode, through the control module 240 of the portable multi-function lighting device 100. Additionally, the memory device 250 of the control module 240 can be pre-programmed with programs to produce different and adjustable shows and can control all types of intelligent lights (having a module 290) at the same time. In one particular embodiment, fixtures having the wireless integrated lighting system module 290 are also controllable via any universal DMX-512 controller and in that case, they perform Ike any other standard DMX-512 fixture. Conversely, the wireless control module 240 is additionally configured as a universal DMX-512 controller and, when used with fixtures that do not include a compatible integrated lighting system module 290, performs like any other universal DMX-512 controller. In such an embodiment, the end user will choose to operate the system using either DMX via an external controller, or using the integrated lighting system protocol of the control module 240.

However, although the wireless control module 240 can control any type of DMX-512 fixture, it is specially designed to control fixtures equipped with an integrated lighting system module 290. Consistent DMX addressing allows the wireless control module 240 to control all types of module 290 containing fixtures (scanners, moving yokes, etc.) at the same time.

In one particular embodiment of the present invention, the wireless control module 240 is configured to be compatible with the ILS™ system by CHAUVET LIGHTING®. One such device 100 is the GIGBAR MOVE+ILS produced by CHAUVET LIGHTING®. Other devices including an integrated lighting system control module 290 operable with the ILS™ system by CHAUVET LIGHTING® include, but are not limited to, the GIGBAR MOVE ILS, the 4BAR FLEX ILS, the 4BAR FLEX Q ILS, the 4BAR QUAD ILS, the 4BAR LT QUAD BT ILS, the COLORBAND H9 ILS, the COLORBAND PIX ILS, the COLORBAND PIXM ILS, the COLORBAND Q3 BT ILS, the COLORBAND T3 BT ILS, the COREPAR Q120 ILS, the COREPAR Q60 ILS, the COREPAR UV120 ILS, the EZLINK PAR Q1 BT ILS, the EZLINK PAR Q4 BT ILS, the EZLINK PAR Q6 BT ILS, the EZLINK STRIP Q6 BT ILS, the EZLINK STRIP Q3 BT ILS, the INTIMIDATOR FREE SPOT 60 ILS, the INTIMIDATOR SPOT 160 ILS, the KINTA FX ILS, the LEDSHADOW 2 ILS, the MINIKINTA ILS, the SCORPION DUALRGB ILS, the SLIMBANK Q18 ILS, the SLIMPAR H6 ILS, the SLIMPAR Q12 ILS, the SLIMPAR Q6 ILS, the SLIMPAR T12 ILS, the SWARM 5 FX ILS and the SWARM WASH FX ILS, all produced by CHAUVET LIGHTING®.

In one particular embodiment of the invention, the wireless controller 240 of a GIGBAR MOVE+ILS can be wirelessly paired to one or more devices including an integrated lighting system module 290, in order to synchronize, for example, four modes of operation with the GIGBARMOVE+ILS. In this example, modes 1 and 3 synchronize with one side of the GIGBARMOVE+ILS, whereas modes 2 and 4 synchronize with the other (second) side of the GIGBARMOVE+ILS. When linked, effects of like devices will sync with the most similar effect on the selected side of the GIGBARMOVE+ILS. For example, derby lights (i.e., KINTA FX ILS and MINIKINTA ILS) will sync with the derbies of the GIGBARMOVE+ILS; moving heads (i.e., INTIMIDATOR FREE SPOT 60 ILS and INTIMIDATOR SPOT 160 ILS) will sync with one of the moving heads of the GIGBARMOVE+ILS; and par lights (i.e., COLORBAND H9 ILS, COREPAR 0120 ILS and SLIMPAR Q12 ILS) will sync with one of the pars. Laser effects (i.e., SCORPION DUALRGB ILS) will sync with the laser and strobe effects (i.e., SWARM WASH FX ILS) will sync with the strobe effects regardless of the mode. For example, if the device including the integrated lighting system module 290 is a COREPAR Q120 ILS, the effects from that device will synchronize with the par light(s) on the side of the GIGBAR MOVE+ILS, based on the selected mode.

Figure 7:
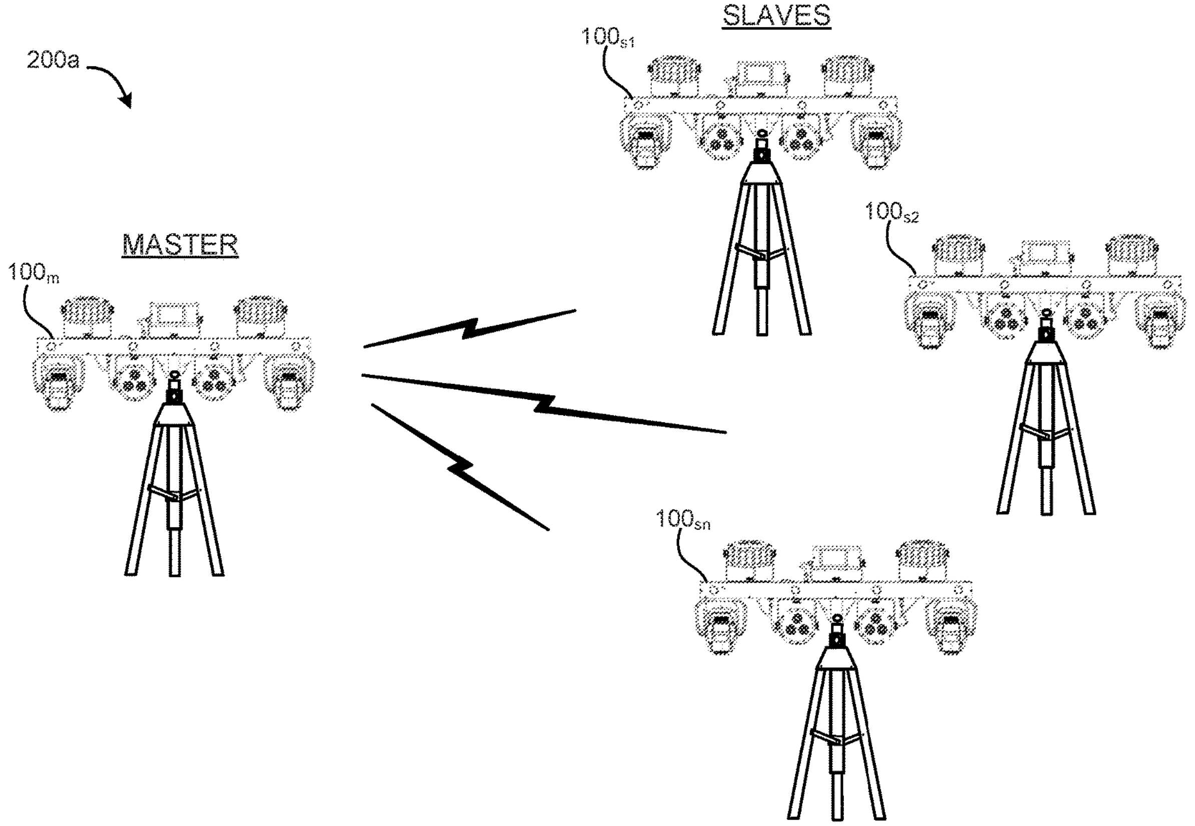
FIG. 7 is a simplified diagram illustrating one exemplary integrated lighting system configuration possible according to the invention.

Referring now to FIGS. 6 and 7, there will be described one particular method for establishing wireless master-slave control between a first portable multi-function lighting device 100$_m$, and one or more portable multi-function lighting devices 100$_{s1}$, 100$_{s2}$, –100$_{sn}$, acting as slave devices in an integrated lighting system 200*a*. In the embodiment of FIG. 7, each of the devices 100$_m$, 100$_{s1}$, 100$_{s2}$ . . . 100$_{sn}$, includes a wireless control module 240, which in this case, acts as the wireless integrated lighting system module 290 when the module 240 is switched from a standalone transmitting mode into a receiving mode. Master-slave mode is initiated in this configuration by first using the user interface 208 of each of the slave devices 100$_{s1}$, 100$_{s2}$ . . . 100$_{sn}$, to place them into "slave" mode. More particularly, menu buttons 208*b* can be pressed until the word "SLAVE" shows on the display 208*a*. After the devices 100$_{s1}$, 100$_{s2}$ . . . 100$_{sn}$, are set into slave mode, the master device 100$_m$ can be set as the master device by using the user interface to select a transmitting channel (from 1-16, in one embodiment). The slave devices should be set to receive on the same channel. Once the master device 100$_m$ has joined, it will control the action of the one or more slave devices 100$_{s1}$, 100$_{s2}$ . . . 100$_{sn}$ of the integrated lighting system 200*b*, without the need for a separate DMX controller. The master device 100$_m$ can be set to operate in either standalone more or with the RF remote, while the slave devices 100$_{s1}$, 100$_{s2}$ . . . 100$_{sn}$, operate in slave mode. Once set and connected, the slave devices 100$_{s1}$, 100$_{s2}$ . . . 100$_{sn}$, will operate in unison with the master device 100$_m$.

It should be understood that one great advantage to the system of the present invention is that the portable multi-function lighting device 100$_m$ can also act as a master device for lighting fixtures that are not portable multi-function lighting devices, but rather, are other types of lighting devices. For example, referring now to FIGS. 6 and 8, there is illustrated another system in which the portable multi-function lighting device 100$_m$ operates as a master device to control the operation of one or more slave devices, at least one of which is not the same type of lighting device as the device 100$_m$. In the particular example illustrated in FIG. 8, the master device 100$_m$ is used to control a plurality of different types of intelligent lighting device, including a portable multi-function lighting device 100$_{s1}$, Kinta light fixtures 280$_{s1}$, 280$_{s2}$, par lights 300$_{s1}$, 300$_{s2}$, and a COLORBAND 310$_{s1}$.

In the embodiment illustrated, each of the lighting devices 100$_{s1}$, 280$_{s1}$, 280$_{s2}$, 300$_{s1}$, 300$_{s2}$, 310$_{s1}$, includes its own integrated lighting system module 290 or wireless control module 240 for receiving and processing control signals from the wireless control module 240 of the master device 100$_m$. It should be noted that, if desired, one or more of the lighting devices 100$_{s1}$, 280$_{s1}$, 280$_{s2}$, 300$_{s1}$, 300$_{s2}$, 310$_{s1}$ can be linked to one or more additional slave devices, via DMX cabling, such that the tethered slave will receive the same signal information from the device 100$_{s1}$, 280$_{s1}$, 280$_{s2}$, 300$_{s1}$, 300$_{s2}$, 310$_{s1}$, from its module 240, 290, by cable. Thus, if the control module 290 of a lighting fixture does not include a wireless receiver, this technique can save money by not requiring the purchase of a wireless receiver for every single lighting fixture of the system. Further, it should be understood that, since all signals processed by the module 240, 290, are provided in accordance with an integrated lighting system protocol, different types of fixtures (e.g., a COLORBAND to a par light) can be connected to one another by cable in order to receive the full signal stream. The module 240, 290 will then be able to pick the packets relevant to that fixture from the full stream provided via the cable.

Additionally, each of the intelligent lighting fixtures 100$_{s1}$, 280$_{s1}$, 280$_{s2}$, 300$_{s1}$, 300$_{s2}$, 310$_{s1}$, includes a user interface (not shown), which can be of the same type as the user interface 280 of the device 100$_{m}$, and which can be used to place the fixture 100$_{s1}$, 280$_{s1}$, 280$_{s2}$, 300$_{s1}$, 300$_{s2}$, 310$_{s1}$, into a slave mode (also referred to as integrated lighting system (ILS) mode) in which it is controlled by signals transmitted from the wireless control module 240 of the device 100$_{m}$. In one particular embodiment relating to an advanced master-slave mode, the integrated lighting system may include an option to differently identify slave devices of the same type, so that those slave devices can alternate and bounce the light back and forth, instead of all slave devices of a particular type performing the exact same effect at all times.

Figure 8:
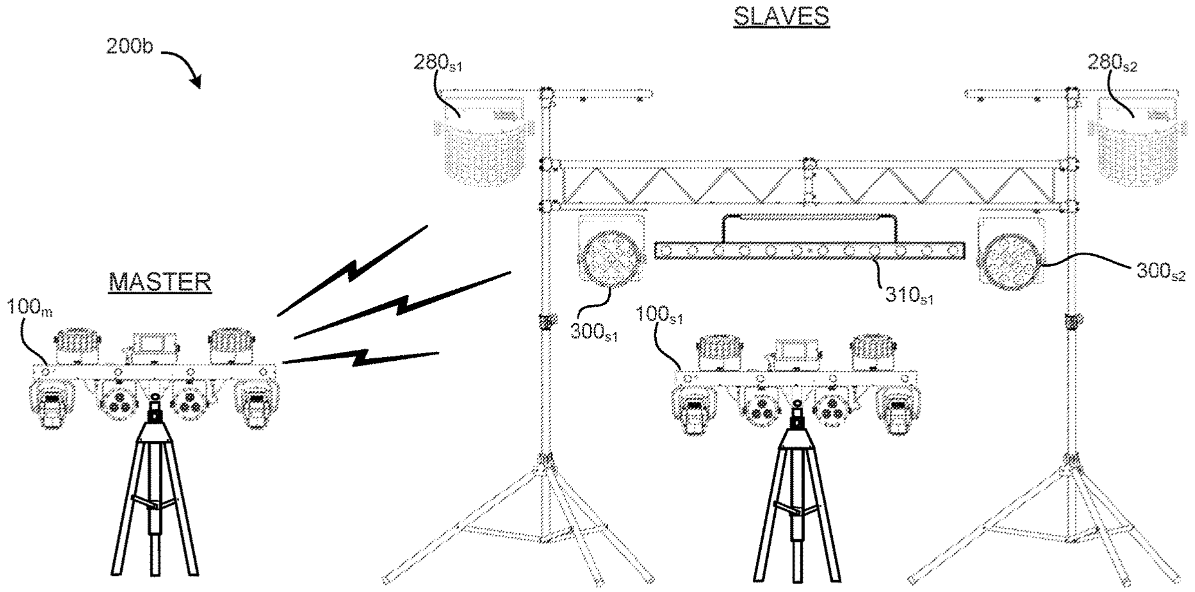
FIG. 8 is a simplified diagram illustrating another exemplary integrated lighting system configuration possible according to the invention.
Figure 9:
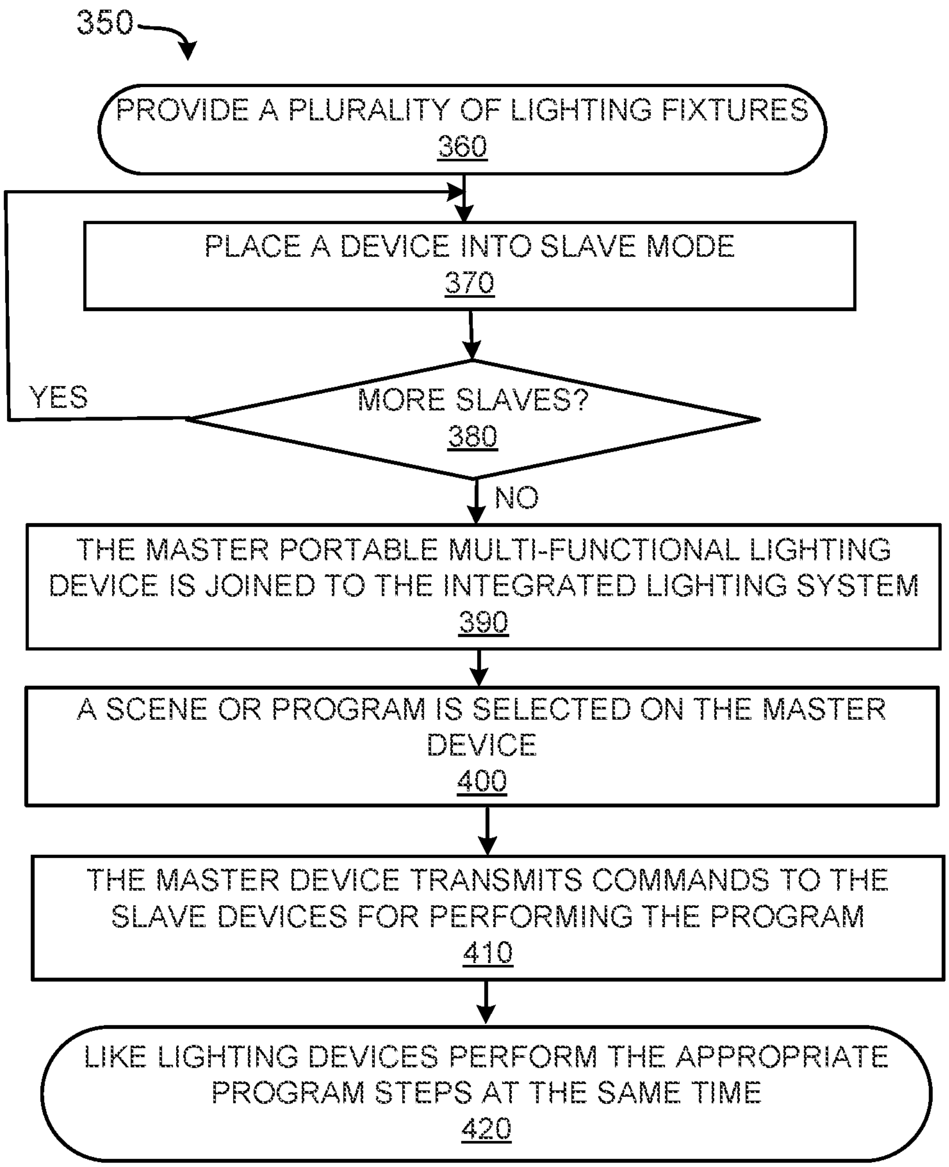
FIG. 9 is a flow diagram illustrating a method of creating an integrated lighting system using a portable multi-function lighting device in accordance with one particular embodiment of the invention.

It is important to note that the integrated lighting system configurations illustrated in FIGS. 7 and 8 are for exemplary purposes only, and that fewer or more lighting fixtures, and/or different types of lighting fixtures than illustrated in FIGS. 7 and 8 can be used in a master-slave configuration with the lighting device 100$_{m}$ without departing from the scope and spirit of the present invention.

Referring now to FIGS. 1-9, there will be described a method 350 for operating a plurality of intelligent lighting fixtures 100$_{s1}$, 100$_{s2}$, 100$_{sn}$, 2805*i*, 280$_{s2}$, 300*s*1, 300$_{s2}$, 310$_{s1}$, under wireless master-slave control from a single portable multi-function lighting device 100$_{m}$. First, a plurality of intelligent lighting fixtures are provided. Step 360. The provided intelligent lighting fixtures include the portable multi-function lighting device 100$_{m}$, which will operate as the master in an integrated lighting system. At least one other intelligent lighting fixture 100$_{s1}$, 100$_{s2}$, 100$_{sn}$, 280$_{s1}$, 280$_{s2}$, 300$_{s1}$, 300$_{s2}$, 310$_{s1}$ is provided, which may include lighting devices that are the same type of lighting fixture as the master (i.e., another portable multi-function lighting device) or of a different type of lighting device than the master, each of which includes a wireless control module 240 or integrated lighting system module 290.

At least one of the intelligent lighting devices 100$_{s1}$, 100$_{s2}$, 100$_{sn}$, 280$_{s1}$, 280$_{s2}$, 300$_{s1}$, 300$_{s2}$, 310$_{s1}$ is then placed into slave mode (i.e., ILS mode). Step 370. This can be done using the user interface of the intelligent lighting device. In another embodiment of the invention, other mechanisms can be used, in addition to the user interface, to place a lighting device into slave mode, such as the remote control 185.

If other intelligent lighting devices exist that are to be put into slave mode, they should also be switched into slave mode before the master device is placed into the master or ILS control mode. Steps 380 and 370.

After all slave devices have been switched into slave mode, the master device 100$_{m}$ is added to the integrated lighting system using the user interface 280 of the master device 100$_{m}$. Step 390. Once joined to the integrated lighting system 200, 200*a*, 200*b*, a lighting program can be set or selected from the program memory of the master device 100$_{m}$. Step 400.

The master 100$_{m}$ device transmits commands to the slave devices 100$_{s1}$, 100$_{s2}$, 100$_{sn}$, 280$_{s1}$, 280$_{s2}$, 300$_{s1}$, 300$_{s2}$, 310$_{s1}$ for performing the set program. Step 410. In one preferred embodiment of the system, to ensure that all lighting devices of the same type are performing the same scene at the same time in real time, the wireless control module 240 transmits all commands (action, color, strobing, etc.) to the slaves 100$_{s1}$, 100$_{s2}$, 100$_{sn}$, 280$_{s1}$, 280$_{s2}$, 300$_{s1}$, 300$_{s2}$, 310$_{s1}$ in real time. In the present preferred embodiment, the transmitted commands are not DMX code, but rather, are commands according to an ILS protocol used by the modules 240, 290.

More particularly, in one embodiment of the invention, the master device 100$_{m}$ transmits the entire show to the chain. Each slave device 100$_{s1}$, 100$_{s2}$, 100$_{sn}$, 280$_{s1}$, 280$_{s2}$, 300$_{s1}$, 300$_{s2}$, 310$_{s1}$ thus receives the entire show, in real time, but only performs the part of the show relevant to that slave. For example, the portable multi-function lighting device 100$_{m}$ is, itself, configured to perform a show using different types of effects. As discussed above, in the present example, the master portable multi-function lighting device 100$_{m}$ has strobe lights 130, par lights 140, moving head spotlights 150, a laser 160 and derby lights 170. Thus, the lighting program executed by the master device 100$_{m}$ includes different style effects based on these types of lighting devices. The master device 100$_{m}$ transmits all of the commands for the entire show to the chain of slave devices to ensure that each of the slave units 100$_{s1}$, 100$_{s2}$, 100$_{sn}$, 280$_{s1}$, 280$_{s2}$, 300$_{s1}$, 300$_{s2}$, 310$_{s1}$, will do the same action as the corresponding lighting fixture of the master device 100$_{m}$. Note that, in one particular embodiment, the master device 100$_{m}$ can also transmit commands to the slave devices that produce other types of theatrical or special effects.

However, when the master device 100$_{m}$ sends the commands for the entire show to the chain of slave devices, the commands are split into different sections, with each section equating to one effect (e.g., section 1 for par effect, section 2 for laser effect, section 3 for strobe effect, section 4 for spotlight, section 5 for derby, etc.). The different style effects of the slave units may differ from the master and from one another. Thus, a heading part of each section is coded with regard to the type of effect to which the particular section relates. Each slave unit monitors the chain and picks out the command sections that are pertinent to the respective slave device, and not the ones that are not pertinent to that respective slave device, based on the heading part coding. If the heading part coding identifies an effect that is to be performed by that slave device, the slave device will pick the commands of that section from the chain and execute them. Step 420. For example, the SWARM 5 FX by CHAUVET LIGHTING® has laser, strobe and derby style effects, but not a moving head spotlight. Therefore, a SWARM 5 FX ILS slave device (i.e., including an integrated lighting system modules 290) will pick from the chain section 2 for laser effect, section 3 for strobe effect, and section 5 for derby effect in order to perform the corresponding actions in unison with the laser effect, strobe effect and derby effect performed by the master device 100$_{m}$ and any slave devices having those effects. However, the SWARM 5 FX ILS will not pick from the chain, commands relating to par effects transmitted in section 1 or commands relating to spotlights transmitted in section 4. The SWARM 5 FX ILS will then perform the parts of the show relevant to it, as defined by the commands picked from the chain, in unison with the master device 100$_{m}$.

In the above-discussed embodiment, the control signals transmitted to the chain of slaves by the master device include all lighting commands for producing the light show. Each slave device picks out the particular commands that are relevant to the respective slave device and executes those commands in unison with the master device 100$_{m}$. However, other methods of transmitting the commands from the master device to the slave device may be used without departing from the scope or spirit of the present invention.

For example, in an alternate embodiment, instead of the transmitted control signals containing all lighting commands for performing the effects for the light show, the control signals transmitted by the master device $\mathbf{100}_m$ may transmit only a stream of command triggers to the slave devices. These command triggers can then be used by each slave device to recall prestored commands for producing the desired effects from a memory of the slave device, for execution in unison with the master device $\mathbf{100}_m$.

In one particular embodiment of the invention, the stream of control signals transmitted to the chain by the master device $\mathbf{100}_m$ only include the lighting commands (and/or triggers) for effects to be performed by the slaves, that correspond to an effect produced by a light of the master device $\mathbf{100}_m$ (i.e., par, derby, spotlight, strobe or laser). However, in a preferred embodiment of the invention, the control signals transmitted in the stream from the master device $\mathbf{100}_m$ to the slave devices $\mathbf{100}_{s1}$, $\mathbf{100}_{s2}$, $\mathbf{100}_{sn}$, $\mathbf{280}_{s1}$, $\mathbf{280}_{s2}$, $\mathbf{300}_{s1}$, $\mathbf{300}_{s2}$, $\mathbf{310}_{s1}$, include lighting commands (and/or triggers) for at least one lighting effect not provided by a lighting device of the portable multi-function lighting device $\mathbf{100}_m$. Thus, in this embodiment, the control signals provided by the master device $\mathbf{100}_m$ can be used to cause one or more slave devices to produce an effect having no corresponding effect on the master device $\mathbf{100}_m$, but which is included as part of the lighting program for the control of slave devices able to produce that effect. The contents of the stream of control signals transmitted by the control module 240 are defined by pre-stored or modified program provided by the processor 260 and/or controller 204. Thus, a pre-stored program can include lighting commands for effects not found on the master device $\mathbf{100}_m$, but possibly found in one or more of the slave devices 10051, $\mathbf{100}_{s2}$, $\mathbf{100}_{sn}$, $\mathbf{280}_{s1}$, $\mathbf{280}_{s2}$, $\mathbf{300}_{s1}$, $\mathbf{300}_{s2}$, $\mathbf{310}_{s1}$. It should be understood that a command to produce a lighting effect not found in the master device or in any of the slave devices, is merely ignored by all devices of the integrated lighting systems 200, 200*a*, 200*b*.

Note that although one particular configuration of the portable multi-function lighting apparatus 100 is described in connection with FIGS. 1-9, other configurations are possible without departing from the scope or spirit of the present invention. For example, it should be understood that the portable multi-function lighting apparatus disclosed in U.S. Pat. No. 10,094,542 could be modified to include a control center, in accordance with the present invention, in order to coordinate wireless, master-slave control of a plurality of other lighting devices and accessories.

While the invention has been described, disclosed, illustrated and shown in various terms of certain embodiments or modifications, which it has presumed in practice, the scope of the invention is not intended to be, nor should it be deemed to be, limited thereby and such other modifications or embodiments as may be suggested by the teachings herein are particularly reserved, especially as they fall within the breadth and scope of the claims here appended. Accordingly, while a preferred embodiment of the present invention is shown and described herein, it will be understood that the invention may be embodied otherwise than as herein specifically illustrated or described, and that within the embodiments certain changes in the detail and construction, as well as the arrangement of the parts, may be made without departing from the principles of the present invention as defined by the appended claims.

We claim:

1. A portable, multi-function lighting apparatus including multiple different lighting effects, comprising:

a mounting light bar extending longitudinally and having an internal cavity and at least one opening formed in an outer surface of a longitudinally extending face of the mounting light bar;

at least one light source providing a first lighting effect mounted within the internal cavity in alignment with said at least one opening through the longitudinally extending face, wherein each at least one light source emits light through said at least one opening in accordance with the first lighting effect;

at least one light fixture removably secured to the mounting light bar outside said internal cavity and providing a second lighting effect different from the first lighting effect;

a controller mounted inside said internal cavity, said controller configured to generate control signals for producing a light show including at least one of said first lighting effect or said second lighting effect, said controller additionally configured to wirelessly transmit said control signals to an external device configured to produce a third effect different from said first lighting effect and said second lighting effect, said third effect including at least one lighting effect or theatrical or special effect produced by said external device in response to said control signals, said external device not being part of the portable multi-function lighting apparatus and being a different type of fixture than the portable multi-function lighting apparatus and said at least one light fixture removably secured to the mounting light bar; and said control signals generated by said controller and wirelessly transmitted to said external device including information by which an integrated lighting system module of said external device can distinguish and execute control signals relevant to its operation for use in producing said third effect.

2. The portable, multi-function lighting apparatus of claim 1, wherein said controller is additionally configured to use said control signals to produce at least one of said first lighting effect with said at least one light source or said second lighting effect with said at least a second light fixture.

3. The portable, multi-function lighting apparatus of claim 1, wherein said controller is additionally configured to be switchable from wirelessly transmitting control signals to the external device to wirelessly receiving control signals from the external device.

4. The portable, multi-function lighting apparatus of claim 2, wherein operation of said controller is switchable between a master mode in which it transmits control signals to the external device and a slave mode in which it receives control signals from another portable multi-function lighting apparatus operating in master mode.

5. The portable, multi-function lighting apparatus of claim 2, wherein said controller additionally includes a plurality of prestored programs for controlling the at least one light source, said at least one light fixture and at least a second light fixture removably secured to the mounting light bar outside said internal cavity and providing a further lighting effect different from the first and second lighting effects.

6. The portable, multi-function lighting apparatus of claim 2, wherein said external device is an external lighting device and said at least one lighting effect or theatrical or special effect is at least one further lighting effect to be coordinated with at least one of said first lighting effect or said second lighting effect.

7. The portable, multi-function lighting apparatus of claim 2, wherein said external device includes at least one theatrical or special effect, said external device including of at least one of a speaker, an atmospheric machine, a confetti launching machine or pyrotechnic equipment.

8. The portable, multi-function lighting apparatus of claim 2, further comprising a stand removably attached to said mounting light bar.

9. The portable, multi-function lighting apparatus of claim 1, wherein said external device is an external lighting device and the control signals generated by the controller include lighting commands to produce each effect in the light show.

10. An integrated lighting system, comprising:

a portable multi-function lighting apparatus including multiple lighting effects;

at least one external device including at least one effect, said external device not being part of the portable multi-function lighting apparatus;

said portable multi-function lighting apparatus including:

a mounting light bar extending longitudinally and having an internal cavity and at least one opening formed in an outer surface of a longitudinally extending face of the mounting light bar;

at least one light source providing a first lighting effect mounted within the internal cavity in alignment with said at least one opening through the longitudinally extending face, wherein each at least one light source emits light through said at least one opening in accordance with the first lighting effect;

at least one light fixture removably secured to the mounting light bar outside said internal cavity and providing a second lighting effect different from the first lighting effect; and a controller mounted inside said internal cavity, said controller configured to generate control signals for producing a light show including at least one of said first lighting effect or said second lighting effect, said controller additionally configured to wirelessly transmit said control signals to said at least one external device not part of the portable multi-function lighting apparatus;

said at least one external device configured to wirelessly receive control signals transmitted by said controller and to use the received control signals to produce at least a third effect with said external device, said at least a third effect being different from said first lighting effect and said second lighting effect; and said at least one external device being a different type of fixture than said portable multi-function lighting apparatus and said at least one light fixture removably secured to the mounting light bar and including an integrated lighting system module configured to distinguish and execute control signals relevant to its operation and to use said distinguished control signals to produce said third effect.

11. The integrated lighting system of claim 10, wherein said controller is additionally configured to use said control signals to produce at least one of said first lighting effect with said at least one light source or said second lighting effect with said at least a second light fixture at a same time as said at least one effect is produced by said external device.

12. The integrated lighting system of claim 11, wherein said at least one external device is a plurality of external devices, each external device of said plurality of external devices including at least one lighting effect, each of said plurality of external devices configured to wirelessly receive control signals transmitted by said controller and to use the received control signals to perform said at least one lighting effect.

13. The integrated lighting system of claim 10, wherein said control signals are transmitted as a stream of lighting commands making up the light show, and each command includes a header pertaining to a type of lighting effect to which the command relates.

14. The integrated lighting system of claim 13, wherein said at least one external device includes at least one lighting effect, and said at least one external lighting device selects lighting commands from said stream based on said header and said at least one lighting effect and executes the selected lighting command in real time to perform said at least one lighting effect in real time.

15. The integrated lighting system of claim 13, wherein said at least one external device is a plurality of external devices, each external device of said plurality of external devices including at least one lighting effect, each external device of said plurality of external devices selecting lighting commands from said lighting stream based on said header and a type of the at least one lighting effect for the respective external device and performing said at least one lighting effect in real time.

16. The integrated lighting system of claim 10, wherein said external device and said portable multi-function lighting apparatus at least one of: are different types of lighting device from one another; or include different lighting effects from one another.

17. A method of forming an integrated lighting system, comprising the steps of:

providing a portable multi-function lighting apparatus having multiple different lighting effects, the portable, multi-function lighting apparatus, including:

a mounting light bar extending longitudinally and having an internal cavity and at least one opening formed in an outer surface of a longitudinally extending face of the mounting light bar;

at least one light source providing a first lighting effect mounted within the internal cavity in alignment with the at least one opening through the longitudinally extending face, wherein each at least one light source emits light through the at least one opening in accordance with the first lighting effect;

at least one light fixture removably secured to the mounting light bar outside the internal cavity and providing a second lighting effect different from the first lighting effect; and a controller mounted inside the internal cavity, the controller configured to generate control signals for producing a light show including at least one of the first lighting effect or the second lighting effect;

providing at least one external device not part of the portable multi-function lighting apparatus, the at least one external device being a different type of fixture than the portable multi-function lighting apparatus and the at least one light fixture removably secured to the mounting light bar, the at least one external device configured to produce at least a third effect different from the first lighting effect and the second lighting effect;

selecting a lighting program producing that produces a desired show with the portable multi-function lighting apparatus;

wirelessly transmitting the control signals from the controller;

receiving the transmitted control signals with the at least one external device;

distinguishing and executing, with an integrated lighting system module of at least one external device, control signals relevant to an operation of the at least one external device; and performing the first lighting effect, the second lighting effect, and the third effect in real time, based on the control signals, the lighting system module using the distinguished control signals to produce the third effect.

18. The method of claim 17, wherein the step of providing at least one external device includes providing a plurality of external devices, each including at least one lighting effect, and the method further includes the step of placing all of the external devices into a slave mode before selecting the lighting program on the portable multi-function lighting apparatus.

19. The method of claim 17, wherein the control signals are transmitted in the transmitting step as a stream of lighting commands, each lighting command pertaining to a particular type of lighting effect, and each of the at least one external devices using only lighting commands from the stream that relate to at least one lighting effect of the at least one external device.

20. The method of claim 19, wherein the at least one external device selects lighting commands from the stream based on the type of the at least one lighting effect and a header attached to the command that identifies a type of lighting effect to which the command pertains.

21. The method of claim 17, wherein the at least one effect includes at least one theatrical or special effect, the external device including of at least one of a speaker, an atmospheric machine, a confetti launching machine or pyrotechnic equipment.

* * * * *